United States Patent

Matsumoto et al.

[11] Patent Number: 5,522,717
[45] Date of Patent: Jun. 4, 1996

[54] MOLD FOR PRESSURE-CAST-MOLDING A CERAMIC ARTICLE FORMED FROM AN OPEN-CELL POROUS MATERIAL

[75] Inventors: Akio Matsumoto, Kitakyushu; Shingo Kasahara, Chigasaki; Yoshifumi Misumi, Kitakyushu; Yoshinori Yamashita, Ogoori, all of Japan

[73] Assignee: Toto Ltd., Kitakyushu, Japan

[21] Appl. No.: 394,070

[22] Filed: Feb. 24, 1995

Related U.S. Application Data

[63] Continuation of Ser. No. 71,995, Jun. 7, 1993, abandoned.

[30] Foreign Application Priority Data

Jun. 9, 1992 [JP] Japan ................ 4-149444

[51] Int. Cl.⁶ ............... B28B 1/26; C08J 9/32
[52] U.S. Cl. .............. 425/84; 249/134; 249/141; 264/41; 425/DIG. 119
[58] Field of Search ............ 425/84, 85, DIG. 119; 249/113, 114.1, 134, 141; 264/86, 87, 219, 41

[56] References Cited

U.S. PATENT DOCUMENTS

| | | | |
|---|---|---|---|
| 4,008,024 | 2/1977 | Yokota et al. | 425/85 |
| 4,464,485 | 8/1984 | Kishima et al. | 521/64 |
| 4,608,403 | 12/1985 | Sellstrom | 523/218 |
| 4,828,771 | 5/1989 | Kishima et al. | 264/41 |
| 4,830,802 | 5/1989 | Ito et al. | 264/135 |
| 4,844,853 | 7/1989 | Ito et al. | 264/225 |
| 4,874,304 | 10/1989 | Ito et al. | 425/84 |
| 4,884,959 | 12/1989 | Ito et al. | 425/84 |
| 4,913,868 | 4/1990 | Ito et al. | 264/135 |
| 4,980,102 | 12/1990 | Hill | 264/54 |
| 5,069,609 | 12/1991 | Ito et al. | 425/84 |
| 5,174,934 | 12/1992 | Saatchi | 264/54 |
| 5,242,635 | 9/1993 | Matsumoto et al. | 264/41 |

FOREIGN PATENT DOCUMENTS

| | | |
|---|---|---|
| 0194757 | 9/1986 | European Pat. Off. . |
| 0276862 | 8/1988 | European Pat. Off. . |
| 0440874 | 8/1991 | European Pat. Off. . |
| 53-2464 | 1/1978 | Japan . |
| 62-26657 | 6/1987 | Japan . |
| 63-31711 | 2/1988 | Japan . |
| 63-42804 | 2/1988 | Japan . |
| 63-31709 | 2/1988 | Japan . |
| 63-31710 | 2/1988 | Japan . |
| 63-75044 | 4/1988 | Japan . |

OTHER PUBLICATIONS

Patent Abstracts of Japan, vol. 112, No. 22, re JP-A-01 297 452, Nov., 1989.
Patent Abstracts of Japan, re JP-A-2 092,503, Apr., 1990.

Primary Examiner—James P. Mackey
Attorney, Agent, or Firm—Cushman, Darby & Cushman

[57] ABSTRACT

A mold for pressure-cast-molding a ceramic article having a filter material made of an open-cell porous material. The open-cell porous material is prepared by stirring a mixture of a resin material, a microballoon, a curing agent and water to provide an emulsion slurry, casting the slurry in a water-impermeable mold and curing the slurry in the water-containing state. The portions occupied by the water during the preparation of the porous material mainly form open pores.

4 Claims, 1 Drawing Sheet

MOLD FOR PRESSURE-CAST-MOLDING A CERAMIC ARTICLE FORMED FROM AN OPEN-CELL POROUS MATERIAL

This is a continuation of application Ser. No. 08/071,995, filed on Jun. 7, 1993, which was abandoned upon the filing hereof.

BACKGROUND OF THE INVENTION

The present invention relates to an open-cell porous material, a method for preparing the same and a mold for pressure-cast-molding a ceramic article which comprises, as a filter medium, the open-cell porous material.

As means for preparing open-cell porous materials used as, for instance, filter mediums, air diffuser materials and mold materials, there have been proposed various methods such as sintering of metallic powder; sintering of thermoplastic resin powder; sintering of inorganic powder; cure of cements through hydration; pressing or stamping of mixtures of thermosetting resins and fillers; a method comprising curing a resin solution containing a pore-forming agent and then removing the pore-forming agent through dissolution-extraction or evaporation; a method which makes use of a blowing agent; and a method comprising curing and polymerizing a W/O type emulsion such as water-containing polyester resin and then evaporating the water.

However, various problems arise when open-cell porous materials are prepared according to these methods. For instance, these methods are substantially limited in shapes and sizes of the resulting products, the preparation thereof often requires a heat-treatment at a high temperature and a high-pressure pressing or they suffer from a problem concerning molding in that the production processes are very complicated.

Moreover, it is very difficult, for these methods, to control the pore size of the porous material which is the most important factor when the resulting porous materials are used as filter mediums and air diffusion materials.

As a method which permits the solution of these problems and the production of a large open-cell porous material having complicated shapes and a desired pore size with a high dimensional accuracy, there has been known a method which comprises stirring a mixture of an epoxy resin, a curing agent, a filler and water to give an emulsion slurry; and then curing the resulting water-containing slurry per se to form an open-cell porous material in which the portion occupied by the water present in the emulsion slurry subsequently form pores. For instance, Japanese Patent Publication for Opposition Purpose (hereinafter referred to as "J.P. KOKOKU") No. Sho 53-2464 accomplishes desired purposes by preparing an O/W type emulsion slurry comprising a glycidyl epoxy resin, a polymerizable fatty acid polyamide curing agent, a filler and water; casting the slurry in a water-impermeable mold to cure the slurry in the water-containing state; and then removing the water. This method permits the production of a large open-cell porous material having a complicated shape with a high dimensional accuracy and can control the pore size by properly selecting the particle size of the filler, the amount of a reactive diluent and the relative amounts of the ingredients used, i.e., the foregoing epoxy resin, curing agent, filler and water. However, the pore size distribution of the open-cell porous material prepared by this method is localized in the region of very low level on the order of not more than 1.5 µm and it is impracticable to use these porous materials in the preparation of filter mediums, air diffusion materials and mold materials.

J.P. KOKOKU No. Sho 62-26657 discloses a method for preparing an open-cell porous material which permits the solution of this problem and which comprises vigorously stirring a mixture comprising a bisphenol type epoxy resin, a curing agent, a filler and water to give an emulsion slurry, the curing agent being a mixture of an amide compound obtained through a reaction of a monomeric fatty acid with an ethyleneamine: $H_2N-(CH_2-CH_2-NH)_n-H$ (wherein n is 3 to 5) and a polymeric fatty acid polyamide obtained through a reaction of a polymeric fatty acid with the foregoing ethyleneamine, or a mixed reaction product obtained through a reaction of a mixture comprising the foregoing monomeric fatty acid, polymeric fatty acid and ethyleneamine; casting the emulsion slurry in a water-impermeable mold to cure it in the water-containing state; and then dehydrating the molded slurry. This method allows the production of a large open-cell porous material having a desired average pore size ranging from 0.5 to 10 µm, preferably 0.5 to 5 µm and, in particular, 1.5 to 5 µm and having a complicated shape with a high dimensional accuracy. In addition, Japanese Un-examined Patent Publication (hereinafter referred to as "J.P. KOKAI") No. Sho 63-75044 discloses a method for preparing an open-cell porous material having a pore size ranging from 0.2 to 10 µm which comprises preparing an emulsion slurry from a mixture comprising a glycidyl epoxy resin, a polyamide curing agent and a modified polyamine curing agent and/or an amine curing agent, a filler and water; and then casting the slurry in a water-impermeable mold to cure it in the water-containing state.

These methods permit the control of the pore sizes of the open-cell porous materials. However, the weights of the porous materials are very important when they are used as industrial materials such as filter mediums, air diffusion materials and mold materials. In particular, if these porous materials are used as mold materials for pressure-cast-molding ceramic articles, most of which have complicated shapes as observed in case of sanitary-wares, the parting of a mold is correspondingly complicated and a large number of split molds and cores must be used. In such case, the resulting molded products are often transferred while a part of the mold is held within the molded article and/or hangs down from the exterior thereof during releasing process after completion of the molding. Accordingly, if the weight of the mold is heavy, the molded article is sometimes deformed due to the weight.

Structures of molds for pressure-cast-molding comprise, for instance, a porous dense layer as a superficial filter medium layer (a layer coming in contact with a slurry and capable of absorbing the solvent in the slurry) and a porous coarse layer as a back-up layer on the back-face as those disclosed in J.P. KOKAI No. 63-31710. In this case, the surface layer is in general thin, while the back-up layer is thick and, therefore, the weight of the mold is mainly determined by that of the back-up layer. The back-up layer is obtained by mixing a liquid resin and a filler in a volume ratio of 15~50:100 in which interstices formed between individual filler materials serve as pores as disclosed in J.P. KOKAI No. Sho 63-31710 and accordingly, the weight of the mold can be reduced by the use of a light aggregate as the filler material.

In some cases, however, the surface layers occupy the space within the mold at a high rate of occupation and the weight of the mold is almost determined by the weight of these surface layers as observed when the mold has a complicated shape, when it is not possible to ensure a thickness sufficient for forming a two layer-structure, i.e., a surface layer•back-up layer structure because of restriction in shape and when the article to be molded has a two layer-structure. In these cases, the weight of the filter medium layer must accordingly be reduced, but it is impossible to reduce the weight thereof by the conventional techniques.

SUMMARY OF THE INVENTION

Accordingly, an object of the present invention is to provide a lightened open-cell porous material without impairing the desired mechanical strength thereof.

Another object of the present invention is to provide a method for preparing a lightened open-cell porous material having a desired mechanical strength.

A further object of the present invention is to provide a mold for pressure-cast-molding a ceramic article which makes use of the foregoing open-cell porous material.

The inventors of this invention have conducted various studies to reduce the weight of the foregoing open-cell porous material without impairing the desired mechanical strength thereof, have found out that the foregoing objects can be accomplished through the use of a microballoon as a filler and have completed the present invention.

According to an aspect of the present invention there is provided an open-cell porous material which is prepared from a material mainly comprising a resin material, a filler material, a curing agent and water, and wherein portions occupied by water during the preparation of the porous material mainly form open pores of the open-cell porous material, characterized in that the filler material is a microballoon.

According to another aspect of the present invention, there is provided a method for preparing an open-cell porous material which comprises the steps of stirring a mixture comprising a resin material, a microballoon, a curing agent and water to give an emulsion slurry and casting the slurry in a water-impermeable mold to cure the slurry in the water-containing state.

According to a further aspect of the present invention, there is provided a mold for pressure-cast-molding a ceramic article comprising, as a filter medium layer, an open-cell porous material which is prepared by stirring a mixture comprising an epoxy compound, a curing agent capable of curing the epoxy compound through a reaction therewith, a microballoon and water to give an emulsion slurry, casting the slurry in a water-impermeable mold and curing the water-containing slurry and wherein portions occupied by water during the preparation of the porous material mainly form open pores of the open-cell porous material.

DESCRIPTION OF THE PREFERRED EMBODIMENTS

Figure 1:
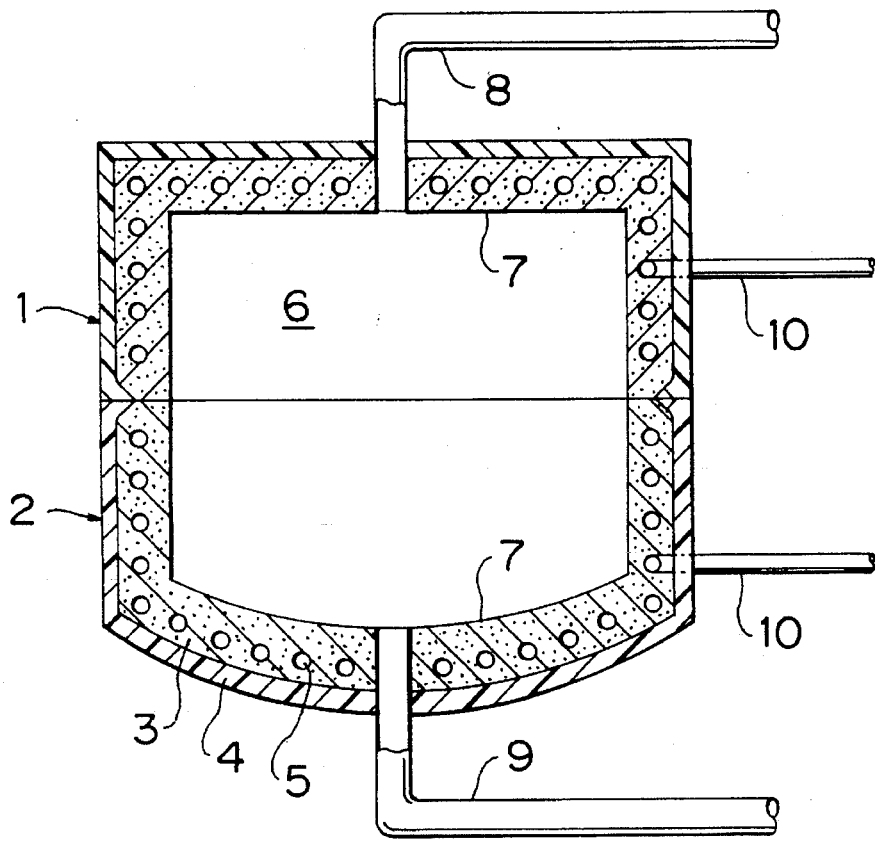
FIG. 1 shows a mold for pressure-cast-molding a ceramic article which comprises the open-cell porous material of the invention provided with hollow passages formed within the porous material.

The present invention will hereinafter be explained in more detail.

Examples of resin materials used in the present invention include epoxy resins, acrylic resins and unsaturated polyester resins usually employed in the preparation of the open-cell porous material of this kind and particularly preferred are epoxy compounds each having at least one epoxy ring in the molecule. Preferred epoxy compounds include those which are liquids at ordinary temperature and have low viscosities, but those preferably used and suitable for the preparation of the emulsion slurries used in the present invention are, for instance, bisphenol type epoxy resins such as bisphenol A type, bisphenol F type and bisphenol AD type ones.

Preferred curing agents which can react with the epoxy compounds to cure the latter include, for instance, polyamide type, polyamine type and modified polyamine type curing agents as well as mixtures thereof which are favorable for preparing emulsion slurries having low viscosities. In addition, the emulsion slurries preferably used in the present invention are O/W type ones (an oil phase is dispersed in water phase). In this respect, if a curing agent used mainly comprises a polyamide type one, an O/W type emulsion slurry can be formed due to the emulsifying action of the polyamide without using any particular emulsifying agent. Particularly preferred polyamide type curing agents are, for instance, a mixture of an amide compound obtained through a reaction of a monomeric fatty acid with an ethyleneamine: $H_2N$—$(CH_2$—$CH_2$—$NH)_n$—$H$ (wherein n is 3 to 5) and a polymeric fatty acid polyamide obtained through a reaction of a polymeric fatty acid with the foregoing ethyleneamine, or a mixed reaction product obtained through a reaction of a mixture comprising the foregoing monomeric fatty acid, polymeric fatty acid and ethyleneamine.

The microballoon used in the present invention as the filler component is the most important ingredient for obtaining the intended lightened open-cell porous material. The open-cell porous material of the present invention comprises three phases, i.e., a resin phase, a filler phase and pore portions and the resin phase has a specific gravity of about 1.1 which does not greatly change with the kinds of resins used. The specific gravity of the pore portion approximately varies depending on the application of the porous material. In most cases, for instance, the porous material is in the water-saturated state when used as a filter medium, in the dried state when used as an air diffusion material and in a semi-water-saturated state when used as a mold material. Therefore, the filler portion must be lightened in order to reduce the weight of the open-cell porous material of the present invention.

Examples of fillers suitably used in the conventional methods (such as those disclosed in J.P. KOKOKU Nos. Sho 53-2464 and Sho 62-26657 and J.P. KOKAI No. Sho 63-75044) include inorganic materials such as silica powder and powdery quartz sand. The specific gravities of silica powder and powdery quartz sand are about 2.64 and other inorganic substances have specific gravities of approximately equal to or higher than this value. The present invention has succeeded in substantial reduction in the weight of the open-cell porous material through the use of a light microballoon as a filler. It has been known that the strength of composite materials commonly used (such as those comprising resin matrices and fillers) is inevitably reduced if the usual light aggregates such as lapilli, volcanic sand, expanded slug and microballoons are used as fillers. However, the porous material of the present invention ensures a strength equal to or greater than that of the porous material which makes use of the conventional hollow material as a filler without impairing other functions such as gas-permeability and water-permeability.

There have been known microballoons having various specific gravities, but the use of microballoons having specific gravities of not more than 1 is desirable for lightening the open-cell porous material. This is because, the specific gravity of the portion occupied by the filler is lower than that of the pore portion (i.e., the portion occupied by water during the preparation of the porous material) when the open-cell porous material used is in the water-saturated state or in the state approximately identical thereto. Therefore, to increase the rate of the filler in the porous material is more effective than to increase the porosity thereof (a ratio of pore portions (i.e., portions occupied by water during the preparation of the porous material)) to lighten the resulting open-cell porous material. If the porosity is increased to lighten the porous material, the strength of the porous material is reduced. In contrast, the porous material of the present invention is lightened by increasing the ratio of the filler (i.e., microballoons) but not increasing the porosity. As a result, the strength of the porous material of the present invention is not reduced.

The term "specific gravity of microballoon" herein means the true specific gravity of the microballoon comprising hollow portions through which at least an emulsion slurry cannot permeate. Some of microballoons have hollow portions which are not isolated from the external environment and, therefore, the microballoons used in the present invention should have hollow portions through which at least an emulsion slurry cannot substantially permeate. Microballoons have been used in making resin-filler composite materials in which the microballoons are mixed with liquid resins and the mixture is then cured. Emulsion slurries having low viscosities such as those used in the present invention may possibly permeate through the hollow portions of the microballoons through which liquid resins having such high viscosities never permeate and accordingly, microballoons should be selected while bearing this point in mind. In particular when a preferred O/W type emulsion is used, microballoons having structures comprising hollow portions through which any water does not substantially permeate should be selected, since water serves as the continuous phase of the emulsion.

The microballoons usable in the present invention are not restricted to specific ones so far as they have structures comprising hollow portions through which the emulsion slurry used in the invention does not substantially permeate, as has already been discussed above. The microballoons are roughly divided into organic and inorganic ones, both of which can be used in the invention.

Generally speaking, the organic type microballoons have very low specific gravities and are thus effective for lightening the open-cell porous material, but they have a tendency to give an open-cell porous material having rather low strength. Examples of organic microballoons include phenol balloons, epoxy balloons, urea balloons and vinylidene chloride balloons.

On the other hand, there have not been known inorganic microballoons having an extremely low specific gravity (the lowest specific gravity thereof is on the order of 0.1), but the resulting open-cell porous material exhibits strength greater than that of the porous material comprising an organic microballoon. Thus, in most cases, inorganic microballoons having high strength are superior to organic ones while taking the quality of the resulting product into consideration.

Preferred inorganic microballoons are those completely or almost substantially comprising vitreous materials. Examples of vitreous balloons include glass balloons, shirasu balloons, pearlite balloons, fly ash balloons, silica balloons, alumina silicate balloons, spinel balloons, alumina balloons and zirconia balloons, all of which may be used in the invention.

In the application of the open-cell porous material to articles having complicated shapes such as a mold for pressure-cast-molding ceramic articles, an accurate shape must be formed through casting of an emulsion slurry into a mold. Therefore, the slurry must have a low viscosity. Moreover, if the volume fraction of a microballoon included in an emulsion slurry is increased in order to lighten the resulting open-cell porous material, the viscosity of the emulsion slurry is necessarily increased and this sometimes makes sufficient agitation of the emulsion slurry difficult. For this reason, a microballoon having an approximately spherical shape is preferably used for increasing the volume fraction of the microballoon in the emulsion slurry and for adjusting the viscosity of the emulsion slurry to a low level. Examples of vitreous microballoons having approximately spherical shapes are glass balloons, fly ash balloons and alumina balloons and preferred are glass balloons and fly ash balloons from the viewpoint of the price and alumina balloons from the viewpoint of the strength of the resulting open-cell porous material.

The particle size of the microballoon should appropriately be selected depending on physical properties required for each particular article to be formed. In general, the smaller the particle size of a microballoon selected, the greater the strength of the resulting open-cell porous material, but if the particle size of the microballoon selected is too small, the dispersibility thereof in the emulsion is reduced and the strength thereof is conversely lowered. The average particle size of the microballoon used herein preferably ranges from 1 to 200µ and more preferably 3 to 60µ from the viewpoint of the strength of the resulting open-cell porous material.

The preferred particle size of the microballoon used must be appropriately selected depending on physical properties required for each intended article to thus ensure the desired functions (such as gas permeability and water-permeability) of the resulting open-cell porous material. In the open-cell porous material of the present invention, a cured resin covers and surrounds each microballoon particle and the cured resin portions each enclosing an individual microballoon particle are linked together to form interstices therebetween which serve as pores of the open-cell porous material. Therefore, the smaller the particle size of a microballoon used, the smaller the size of the resulting interstice or the diameter of the pore formed and accordingly the lower the gas-permeability and water-permeability of the resulting open-cell porous material.

If the open-cell porous material is used in making a mold for pressure-cast-molding ceramic articles, the average pore size is preferably on the order of from about 0.5 to 15µ and more preferably on the order of from 1 to 6µ. Further the average particle size of the microballoon must be limited to the range of from about 2 to 60µ in order to obtain an open-cell porous material having an average pore size on the order of from 0.5 to 15µ and must be controlled to the ranges of from 3 to 40µ in order to obtain an open-cell porous material having an average pore size on the order of from 1 to 6µ.

As discussed above, the functions of the open-cell porous material such as the gas-permeability and water-permeability can be expressed in terms of the average pore size thereof, but are more preferably expressed in terms of quantities of a gas and water which permeate through the pore under specified conditions for gas permeation and water permeation as used in the following Examples.

In general, the smaller the average particle size of the microballoon used, the higher the viscosity of the resulting emulsion slurry. However, the viscosity of the emulsion slurry is not influenced by the average particle size of the microballoon, but is greatly influenced by the particle size distribution thereof. More specifically, microballoons having small particle sizes intervene or penetrate into interstices formed between microballoons having large particle sizes when the microballoon used has a wide particle size distribution and thus the viscosity of the emulsion slurry can be reduced to a level smaller than that observed when a microballoon having a uniform particle size is used. For this reason, the viscosity of the emulsion slurry can be reduced through the use of a mixture of a plurality of microballoons having different particle sizes.

The average particle size of the microballoon cannot arbitrarily be controlled through pulverization unlike silica powder and quartz sand conventionally used as fillers. This is because the hollow structures thereof are broken through pulverization. The microballoons used in the present invention may be those commercially available, but those having small average particle sizes and low specific gravities are hardly available. In order to obtain an open-cell porous material having a desired average pore size and a weight as low as possible, it is preferred, in most cases, that a microballoon having a large average particle size and a low specific gravity be prepared by admixing a plurality of microballoons having different average particle sizes instead of using a microballoon having a particular average particle size which permits the production of an open-cell porous material having a desired average pore size. The use of the microballoon having a large average particle size and a low specific gravity serves to lighten the resulting open-cell porous material. In addition, if it is hard to get a microballoon having an appropriate average particle size which permits the production of an open-cell porous material having a desired average pore size, commercially available microballoons each having an average particle size greater than or smaller than the desired value may be mixed and put into practical use.

Most of inorganic microballoons have hydrophilic surfaces. Therefore, the surface thereof may be modified to improve the adhesion thereof to a resin subsequently applied thereto and to thus enhance mechanical properties of the resulting open-cell porous material.

The simplest surface-modifying method is to apply a coupling agent onto the surface of these inorganic microballoons. Examples of such coupling agents include silane coupling agents, titanium coupling agents and aluminum coupling agents, but the most preferred are silane coupling agents when various factors such as the cost thereof, the extent of improvement in its strength and the simplicity of the surface-treatment with the agent are put together. However, titanium type coupling agents are effective in a special application in which the open-cell porous material must have flexibility and aluminum type coupling agents are likewise effective when a microballoon having a very poor dispersibility (for instance, those having complicated shapes) is used.

Examples of preferred silane coupling agents include N-β-(aminoethyl)-γ-aminopropyltrimethoxysilane, γ-aminopropyltriethoxysilane, vinyltriethoxysilane, vinyl-tris(2-methoxyethoxy)silane, γ-methacryloxy-propyltrimethoxysilane, β-(3,4-epoxy-cyclohexyl)ethyltrimethoxysilane, γ-glycidoxy-propoyltrimethoxysilane, γ-mercaptopropyl-trimethoxysilane, γ-ureidopropyltriethoxysilane and vinyltriacetoxysilane.

The surface modification of a microballoon with a coupling agent can be performed by, for instance, a method comprising spraying an aqueous solution of a coupling agent or a solution thereof in an organic solvent upon the microballoon while stirring the microballoon in the dry condition and then removing the water or the organic solvent to dry the sprayed microballoon; or a method comprising dissolving a coupling agent in water or an organic solvent, dipping a microballoon in the resulting solution, then stirring the solution, filtering the mixture, removing the water or the organic solvent through pressing and finally drying the microballoon. In either of these methods, the final drying process is desirably carried out at a temperature of not less than 100° C.

When the emulsion slurry used in the invention is prepared in the form of an O/W type one, the continuous phase comprises water. Therefore, the emulsion slurry may be prepared by directly adding a water-soluble coupling agent to the slurry; and mixing a microballoon, water and a water-soluble coupling agent and then adding a resin to the mixture to give an emulsion slurry. These methods are very simple, but do not ensure sufficient surface-modification of the microballoon. For this reason, the surface-modifying process preferably comprises a drying step as the final step when mechanical properties of the resulting porous material are regarded as of major importance.

Since the minimum coating area varies depending on the kinds of coupling agents, the amount thereof to be added is calculated according to the following equation:

$$A_{CA}=S_{micro}/S_{min(CA)}$$

wherein $A_{CA}$ means the amount of a coupling agent to be added per unit weight of a microballoon, $S_{micro}$ means the specific surface area of the microballoon and $S_{min(CA)}$ means the minimum coating area of the coupling agent used.

In this respect, this equation simply gives a rough estimate of the amount of a coupling agent to be added and, therefore, it is preferred to add the corresponding coupling agent in an amount of 0.5 to 10 times the rough estimate.

Incidentally, when a microballoon surface-modified with a coupling agent is used as a filler, the gas-permeability and water-permeability of the resulting porous material is often undesirably high. In this case, the gas-permeability and water-permeability thereof must be reduced. To this end, the rate of water in the emulsion slurry should be reduced (or the porosity should be reduced). However, this method results in an increase of the viscosity of the emulsion slurry. Moreover, when an O/W type emulsion slurry is prepared using a microballoon surface-modified with a coupling agent, the resulting emulsion slurry sometimes has a viscosity higher than that of the emulsion slurry prepared using a microballoon free of any surface modification.

Such a viscosity increment observed on the emulsion slurry prepared using a surface-modified microballoon as a filler can be prevented through the use of a mixture of a surface-modified microballoon and a microballoon free of such surface modification. In this case, if a plurality of microballoons of different average particle sizes are employed, each microballoon may be a mixture of a surface-modified microballoon and the microballoon free of such surface modification.

In addition to the foregoing epoxy compounds, curing agents and microballoons detailed above, the emulsion slurry used in the present invention may further comprise other ingredients, for instance, reactive diluents such as allyl glycidyl ether, butyl glycidyl ether, styrene oxide, phenyl glycidyl ether, ethylene glycol diglycidyl ether, cresyl glycidyl ether, neopentyl glycol diglycidyl ether, 1,6-hexanediol diglycidyl ether and trimethylolpropane triglycidyl ether; curing-accelerators such as benzyldimethylamine and 2,4,6-tris(dimethylaminomethyl)phenol; and soluble inorganic salts and alkali or alkaline earth metal hydroxides such as potassium chloride, sodium chloride, zinc chloride, calcium chloride, barium chloride, titanium chloride, iron chloride, nickel chloride, magnesium chloride, aluminum sulfate, zinc sulfate, ammonium aluminum sulfate, potassium aluminum sulfate, potassium sulfate, cobalt sulfate, iron sulfate, copper sulfate, sodium sulfate, nickel sulfate, magnesium sulfate, manganese sulfate, sodium hydroxide, potassium hydroxide and calcium hydroxide.

If the ingredients from which an emulsion slurry is prepared can be divided into three phases, i.e., a resin phase (including epoxy compounds and curing agents as well as optionally added reactive diluents and curing-accelerators), a microballoon phase and a water phase and the total emulsion slurry is assumed to be 100% by volume, the preferred volume ratios thereof range from 8 to 45% by volume for the resin phase, 20 to 65% by volume for the microballoon phase and 20 to 60% by volume for the water phase.

The open-cell porous material of the present invention can be used in, for instance, producing a mold for pressure-cast-molding a ceramic article.

The pressure-cast-molding of a ceramic article comprises the steps of casting, into a porous mold, a slurry which comprises a particulate basis material such as clay and a solvent such as water, applying a pressure to the slurry to remove the solvent through the absorption thereof by the mold and to thus solidify the slurry and then releasing the solidified and molded article from the mold. This molding method is more specifically divided into the solid casting in which a mold absorbs the solvent from a slurry through both sides of an article to be molded and the drain casting in which a mold absorbs the solvent from a slurry through one side of an article to be molded and the excess slurry is drained after the thickness of the article reaches a desired level. The mold of the present invention for pressure-cast-molding ceramic articles can be used in both of these methods.

A preferred embodiment of the mold of this type for pressure-cast-molding includes a means for flowing a gas and water during releasing the resulting molded article from the mold. This means is provided for applying a pressure to the back face of the mold (the face opposite to the casting face) upon releasing the molded article from the mold to exude the solvent (of the slurry) absorbed by the mold and air between the casting face of the mold and the molded article and to thus make the release of the article from the mold smooth.

Preferred examples of the means for flowing a gas and water include hollow passages formed within the open-cell porous material. The hollow passages are arranged in such a manner that solvents and air are uniformly oozed out to the surface of the open-cell porous material (the casting face of the mold) and they are connected to one or a plurality of passages which are communicated to the outside of the mold. When releasing a molded article from the mold, the solvent and air can be oozed out to the interface between the casting face of the mold and the molded article by forcing compressed air into the mold through the passage communicated to the outside and the hollow passages.

Methods for forming these hollow passages within an open-cell porous material are disclosed in, for instance, J.P. KOKAI Nos. Sho 63-42804 and Sho 63-31711.

Alternatively, a mold for pressure-cast-molding a ceramic article may preferably be provided with, as another means for flowing a gas and water, a coarse and porous layer formed on the back face (the face opposite to the casting face of the mold) of the open-cell porous material.

The coarse porous layer is provided with one or a plurality of passages communicated to the outside of the mold. Accordingly, a solvent and air can be uniformly oozed out to the surface of an open-cell porous material by forcing compressed air into the mold through the passages communicated to the outside of the mold irrespective of the arrangement of the passages in the coarse porous layer since the coarse porous layer is substantially coarser than the layer of the open-cell porous material.

Preferred coarse porous layers are those obtained by mixing liquid resins such as epoxy resins and fillers having particle sizes ranging from 0.1 to 5.0 mm in volume ratios of 15~50:100, in which the fillers serve to form interstices between the filler particles and the interstices serve as pores. When a coarse porous layer formed from such a material is used and the weight of the coarse porous layer is negligibly small as compared with that of the open-cell porous material, inorganic fillers commonly used such as quartz sand powder may be employed as fillers for the coarse porous layer. On the other hand, when the weight of the coarse porous layer is not negligibly small, it is preferred to use light aggregates as fillers for the coarse porous layer. In this respect, the light aggregate may be microballoons used in the present invention as ingredients of the open-cell porous material. Incidentally, when a microballoon of this type is used in the preparation of the open-cell porous material, it must have such a hollow structure that any emulsion slurry never permeates into the hollow portions, as has been discussed above. However, the light aggregates used in the coarse porous layer must not satisfy this requirement. Moreover, the microballoons are in general very expensive. For this reason, light aggregates usable in the invention may be, for instance, lapilli, volcanic sand, coal cinders, expanded slug, expanded clay, expanded shale and diatomaceous earth.

A method for forming a coarse porous layer on the back face of the open-cell porous material is disclosed in, for instance, J.P. KOKAI No. Sho 63-31710.

As has been discussed above in detail, the open-cell porous material is light since a microballoon is used as a filler. If the porous material is used for forming into a mold for pressure-cast-molding ceramic articles, other facilities such as fixing parts and mold clamping devices can be lightened and made compact. Moreover, molded articles never cause deformation even if the molded article is transferred while a split mold is fixed to the article immediately after it is released from the mold.

The present invention will hereinafter be explained in more detail with reference to the following non-limitative working Examples and the effects practically accomplished by the present invention will also be discussed in detail in comparison with Comparative Examples.

EXAMPLES 1 TO 16

Each material having a formulation listed in the following Table 1 or 2 was introduced into an open stainless steel container and vigorously stirred at ordinary temperature for 10 minutes to give each corresponding uniform emulsion slurry. The resulting emulsion slurries each was casted into an appropriate water-impermeable mold and allowed to stand for 24 hours in a chamber maintained at 45° C. to cure the water-containing emulsion slurry per se while preventing any evaporation of water by covering the mold. The cured products each was released from the mold and the water present therein was removed by allowing the product to stand over 24 hours in a dryer maintained at 50° C. to give each corresponding open-cell porous material. The resulting open-cell porous materials thus produced have physical properties as listed in the following Tables 3 and 4. In Tables 1 to 4, Comparative Example (Comp. Ex.) relates to a conventional technique (see J.P. KOKAI No. Sho 59-71339) and Examples 1 to 16 correspond to illustrative examples of the present invention.

TABLE 1

| Ingredients | Comp. Ex. | 1 | 2 | 3 | 4 |
|---|---|---|---|---|---|
| epoxy compound(1) | 648 | 648 | 648 | 648 | 648 |
| curing agent (2) | 218 | 218 | 218 | 218 | 218 |
| curing accelerator(3) | 18 | 18 | 18 | 18 | 18 |
| quartz sand powder(4) | 2803 | | | | |
| microballoon (5) | | | 956 | | |
| microballoon (6) | | | | 372 | |
| microballoon (7) | | | | | |
| microballoon (8) | | | | | 212 |
| microballoon (9) | | 32 | | | |
| microballoon (10) | | | | | |
| microballoon (11) | | | | | |
| microballoon (12) | | | | | |

TABLE 1-continued

| | | | | | |
|---|---|---|---|---|---|
| coupling agent (13) | | | | | |
| coupling agent (14) | | | | | |
| coupling agent (15) | | | | | |
| water | 1348 | 1348 | 1348 | 1348 | 1348 |
| Volume Ratio (16) (% by volume) | | | | | |
| Water | 42 | 42 | 42 | 42 | 42 |
| Resin | 25 | 25 | 25 | 25 | 25 |
| Filler | 33 | 33 | 33 | 33 | 33 |

| Ingredients | Examples 5 | 6 | 7 | 8 |
|---|---|---|---|---|
| epoxy compound(1) | 648 | 648 | 648 | 648 |
| curing agent (2) | 218 | 218 | 218 | 218 |
| curing accelerator(3) | 18 | 18 | 18 | 18 |
| quartz sand powder(4) | | | | |
| microballoon (5) | | | | |
| microballoon (6) | | | | |
| microballoon (7) | | 685 | | |
| microballoon (8) | | 498 | | |
| microballoon (9) | | | | |
| microballoon (10) | 722 | | | |
| microballoon (11) | | | 261 | |
| microballoon (12) | | | | 354 |
| coupling agent (13) | | | | |
| coupling agent (14) | | | | |
| coupling agent (15) | | | | |
| water | 1348 | 1106 | 804 | 1769 |
| Volume Ratio (16) (% by volume) | | | | |
| Water | 42 | 22 | 40 | 55 |
| Resin | 25 | 16 | 40 | 25 |
| Filler | 33 | 62 | 20 | 20 |

TABLE 2

| Ingredients | Examples 9 | 10 | 11 | 12 | 13 | 14 | (17) 15 | (18) 16 |
|---|---|---|---|---|---|---|---|---|
| epoxy compound(1) | 648 | 648 | 648 | 648 | 648 | 648 | 648 | 648 |
| curing agent(2) | 218 | 218 | 218 | 218 | 218 | 218 | 218 | 218 |
| curing accelerator(3) | 18 | 18 | 18 | 18 | 18 | 18 | 18 | 18 |
| quartz sand powder(4) | | | | | | | | |
| microballoon(5) | | | | | | | | |
| microballoon(6) | | | | | | | | |
| microballoon(7) | | 2456 | 1228 | | | | 1228 | 1228 |
| microballoon(8) | 447 | | 224 | 447 | 447 | 447 | 224 | 224 |
| microballoon(9) | | | | | | | | |
| microballoon(10) | | | | | | | | |
| microballoon(11) | | | | | | | | |
| microballoon(12) | | | | | | | | |
| coupling agent (13) | | | | | | 3.6 | 11.6 | 5.8 |
| coupling agent (14) | | | | | | 3.6 | | |
| coupling agent (15) | | | | | 3.6 | | | |
| water | 1429 | 1429 | 1429 | 1429 | 1429 | 1429 | 1429 | 1429 |
| Volume Ratio (16) (% by volume) | | | | | | | | |
| Water | 32 | 32 | 32 | 32 | 32 | 32 | 32 | 32 |
| Resin | 18 | 18 | 18 | 18 | 18 | 18 | 18 | 18 |
| Filler | 50 | 50 | 50 | 50 | 50 | 50 | 50 | 50 |

(Notes)
(1) EPICOTE 815: a bisphenol A type epoxy resin (available from Yuka Shell Epoxy Co., Ltd.)

TABLE 2-continued

| | Examples | | | | | | | |
|---|---|---|---|---|---|---|---|---|
| Ingredients | 9 | 10 | 11 | 12 | 13 | 14 | (17) 15 | (18) 16 |

(2) A polyamide curing agent: a reaction product obtained by mixing the following components and reacting them in an $N_2$ gas atmosphere for 2 hours at a temperature ranging from ordinary temperature to 230° C. and then for 2 hours at a temperature ranging from 230 to 240° C.:
oleic acid (monomeric fatty acid) 29.9% by weight
dimeric acid (Polymerizable fatty acid) 29.9% by weight
tetraethylenepentamine (ethyleneamine) 40.2% by weight
(3) TAP: 2,4,6-tris(dimethylaminomethyl)phenol (a curing accelerator available from Kayaku Nuri Co., Ltd.)
(4) quartz sand powder having an average particle size of 15 μ and a specific gravity of 2.64
(5) SILAX PB-02: a shirasu balloon having an average particle size of 27 μ and a specific gravity of 0.9 (available from Silax Co., Ltd.)
(6) SILCELL 32: a pearlite balloon having an average particle size of 33 μ and a specific gravity of 0.35 (available from Silbrico Co., Ltd.)
(7) HSC-110: a glass balloon having an average particle size of 8 μ and a specific gravity of 1.1 (available from Toshiba Ballotini Co., Ltd.)
(8) GLASSBUBBLES E22X: a glass balloon having an average particle size of 30 μ and a specific gravity of 0.2 (available from Sumitomo 3M Ltd.)
(9) MATSUMOTO MICROSPHERE F-30E: a balloon of vinylidene chloride copolymer having an average particle size of 50 μ and a specific gravity of 0.03 (available from Matsumoto Yushi Seiyaku Co., Ltd.)
(10) MICROCELLS SL75: a fly ash balloon having an average particle size of 36 μ and a specific gravity of 0.68 (available from Taiyo Shoji Co., Ltd.)
(11) SILAX PB-03: a shirasu balloon having an average particle size of 54 μ and a specific gravity of 0.65 (available from Silax Co., Ltd.)
(12) SILAX PB-09H: a shirasu balloon having an average particle size of 150 μ and a specific gravity of 0.55 (available from Silax Co., Ltd.)
(13) A1120: N-β-(aminoethyl)-γ-aminopropyl-trimethoxysilane (available from Nippon Unicar Co., Ltd.)
(14) A187: γ-glycidoxy-propyltrimethoxysilane (available from Nippon Unicar Co., Ltd.)
(15) TTS: isopropyl triisostearoyl titanate (available from Ajinomoto Co., Ltd.)
In respect of Notes (13), (14) and (15), the surface-treatment of a microballoon with each coupling agent was carried out by a dry method. After the surface-treatment, the microballoon was dried at 120° C. for 12 hours and then classified by passing it through a sieve of 60 mesh size.
(16) The volume ratio: water/resin/microballoon was calculated on the basis of the following assumptions:
specific gravity of water = 1
specific gravity of resin
(EPICOTE 815+polyamide curing agent+TAP) = 1.1
specific gravity of filler (microballoon, quartz sand) = see Notes (4) to (12) described above
(17) In Example 15, the microballoon HSC-110 was surface-treated with 9.8 g of A1120 (silane coupling agent) and GLASSBUBBLES E22X was surface-treated with 1.8 g of A1120.
(18) The microballoon used in Example 16 comprised 614 g of HSC-110 surface-treated with 4.9 g of A1100, 614 g of untreated HSC-110, 112 g of GLASSBUBBLES E22X surface-treated with 0.9 g of A1100 and 112 g of untreated GLASSBUBBLES E22X.

TABLE 3

| Items | Comp. Ex. | Examples | | | |
|---|---|---|---|---|---|
| | | 1 | 2 | 3 | 4 |
| Dry Bulk Density[1] | 1.15 | 0.28 | 0.57 | 0.39 | 0.34 |
| Bend Strength at Water-Saturation[2] (kgf/cm²) | 66 | 33 | 57 | 60 | 61 |
| Gas-Permeability[3] (l/min) | 3.8 | 18 | 14 | 15 | 17 |
| Water-Permeability[4] (ml/min) | 110 | 300 | 260 | 260 | 300 |
| Viscosity of Slurry[5] (cp) | 7800 | 24000 | 6500 | 5700 | 1400 |

| Items | Examples | | | |
|---|---|---|---|---|
| | 5 | 6 | 7 | 8 |
| Dry Bulk Density[1] | 0.50 | 0.41 | 0.57 | 0.39 |
| Bend Strength at Water-Saturation[2] (kgf/cm²) | 61 | 71 | 58 | 41 |
| Gas-Permeability[3] (l/min) | 16 | 6.8 | 21 | 40 |
| Water-Permeability[4] (ml/min) | 290 | 120 | 350 | 630 |
| Viscosity of Slurry[5] (cp) | 1800 | 8000 | 8000 | 7500 |

TABLE 4

| Items | Examples | | | |
|---|---|---|---|---|
| | 9 | 10 | 11 | 12 |
| Dry Bulk Density[1] | 0.30 | 0.75 | 0.52 | 0.30 |
| Bend Strength at Water-Saturation[2] (kgf/cm²) | 72 | 75 | 79 | 70 |
| Gas-Permeability[3] (l/min) | 14 | 1.6 | 6.2 | 24 |
| Water-Permeability[4] (ml/min) | 250 | 31 | 110 | 420 |
| Viscosity of Slurry[5] (cp) | 8500 | 9200 | 7000 | 8500 |

| | Examples |
|---|---|

TABLE 4-continued

| Items | 13 | 14 | 15 | 16 |
|---|---|---|---|---|
| Dry Bulk Density[1] | 0.30 | 0.30 | 0.52 | 0.52 |
| Bend Strength at Water-Saturation[2] (kgf/cm$^2$) | 95 | 95 | 102 | 99 |
| Gas-Permeability[3] (l/min) | 20 | 22 | 10 | 6.7 |
| Water-Permeability[4] (ml/min) | 320 | 400 | 180 | 120 |
| Viscosity of Slurry[5](cp) | 15000 | 13000 | 12000 | 8500 |

(Notes)
[1]The bulk density was determined by the Arkhimedes method after completely drying each corresponding open-cell porous material.
[2]The size of each test piece = 15 mm × 15 mm × 120 mm; three-point bending test; span 100 mm; head speed 2.5 mm/min; the test piece was in the completely water-saturated state.
[3]The size of each test piece = 60 mm φ × 20 mmt. An air pressure of 2 kg/cm$^2$ was applied to each test piece in the completely water-saturated state and the gas-permeability was determined in terms of the amount of air passing through the piece till 5 minutes after the initiation of the compressed air application.
[4]The size of each test piece = 60 mm φ × 20 mmt. A hydraulic pressure of 2 kg/cm$^2$ was applied to each test piece in the completely water-saturated state and the water-permeability was determined in terms of the amount of water passing through the piece till 5 minutes after the initiation of the compressed air application.
[5]The viscosity was determined by a Brookfield type viscometer after the stirring of the slurry was completed.

As will be apparent from the results of Comparative Example and Examples 1 to 16, the bulk density of the resulting open-cell porous material is approximately determined by the volume ratio of ingredients for the emulsion slurry. Therefore, the open-cell porous material can be lightened through the use of a light balloon in a high rate (volume ratio).

An organic balloon was used in Example 1. The organic balloon is effective for lightening the porous material, but the strength of the resulting porous material is slightly impaired.

The results of Examples 2 to 5 show that the viscosities of emulsion slurries vary depending on the shapes of the microballoons used. More specifically, the viscosity of the emulsion slurry which makes use of a spherical microballoon (GLASSBUBBLES E22X, MICROCELLS SL75) is lower than that of the emulsion slurry obtained using an aspherical balloon (SILAX PB02, SILCELL 32).

The results of Example 6 show that an increase in the viscosity of the slurry can be suppressed through the use of a combination of a plurality of balloons having different particle sizes even if the rate (volume ratio) of the balloon is very high.

Aspherical balloons having large particle sizes were used in Examples 7 and 8. The baloon of this type increases the viscosity of the resulting emulsion slurry and therefore, the volume ratio thereof cannot be increased so much.

The results of Examples 9 to 11 wherein a combination of two kinds of microballoons having different particle sizes are used in each Example indicate that the gas-permeability and water-permeability of each resulting porous material are, respectively, intermediate between those for the porous materials obtained separately using these microballoons and that the strengths are increased and the viscosities of the slurries are decreased as compared with those achieved by separately using these microballoons.

In Examples 12 to 14, microballoons surface-treated with coupling agents are used. The results obtained in these Examples indicate that, as a rule, the strengths, gas-permeabilities and water-permeabilities of these porous materials as well as the viscosities of the slurries containing these microballoons are increased by the use of the surface-treated microballoon.

In Examples 15 and 16, a plurality of balloons were used in combination and surface-treated with the coupling agents. The strengths of the resulting porous materiala are sufficiently improved by surface-treating only a half of each balloon with the coupling agent and it is also found that the gas-permeabilities and water-permeabilities of the resulting porous materials as well as the viscosities of the slurries are not substantially increased as compared with those achieved by using only microballoons free of surface-treatments.

EXAMPLE 17

Figure 2:
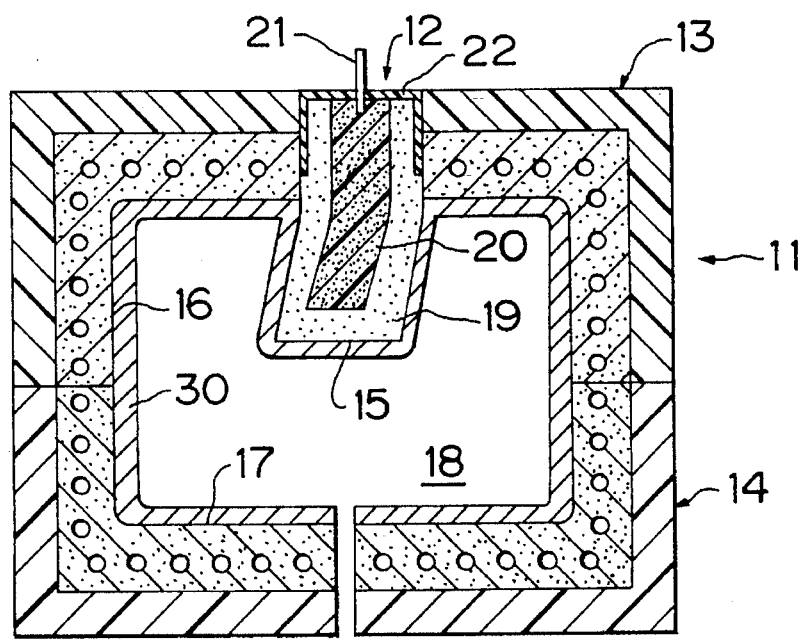
FIG. 2 shows a mold for pressure-cast-molding a ceramic article which comprises the open-cell porous material of the invention and a coarse porous layer formed on the back face of the porous material.

Molds for pressure-cast-molding ceramic whitewares having structures as shown in FIGS. 1 and 2 were produced using the open-cell porous materials prepared in Comparative Example and Examples 6 and 16.

FIG. 1 shows a structure in which hollow passages were formed within each open-cell porous material. In FIG. 1, reference numeral 1 represents a top mold and 2 a bottom mold. A casting space 6 is defined by combining these two forces. Reference numeral 3 represents an open-cell porous material having a casting face 7, i.e., either one of the open-cell porous materials produced in Comparative Example and Examples 6 and 16. Reference numeral 4 denotes an epoxy resin for sealing and 5 a hollow passage for allowing the passage of water and air. Each hollow passage of the top mold is connected to each corresponding hollow passage of the bottom mold (not shown), each hollow passage is communicated to the outside of the mold and likewise connected to a tube 10 for forcing compressed air into the mold during releasing the molded article from the mold. The casting space 6 opens to slurry-supply pipe 9 for supplying and draining a slurry and a piping 8 for forcing compressed air into the casting space during draining the slurry and hardening the molded article.

FIG. 2 shows an embodiment of the mold which comprises an open-cell porous material and a coarse porous layer applied onto the back face of the porous material. FIG. 1 shows an embodiment of the mold for pressure-cast-molding ceramic whitewares in which the open-cell porous material of the present invention is formed into the body of the mold, while FIG. 2 shows an embodiment of the mold in which a part of the split molds thereof is formed from the open-cell porous material of the present invention. In FIG. 2, reference numeral 12 represents a split mold having a plug-like shape and inserted into a top mold 13, and the top mold 13 and a bottom mold 14 are assembled into a casting mold 11. The split mold 12, the top mold 13 and the bottom mold 14 form a casting space 18 wherein faces 15, 16 and 17 of these parts serve as casting faces. Reference numeral 19 represents an open-cell porous material, i.e., either one of the open-cell porous materials produced in Comparative Example and Examples 6 and 16. Reference numeral 20 denotes a coarse porous layer formed from a mixture of an epoxy resin and quarz sand in a volume ratio of 20:100. A piping 21 for supplying compressed air to the mold during releasing a molded article from the mold is embedded in the coarse porous material 20. Reference numeral 22 represents an epoxy resin for sealing. The details of the top mold 13 and the bottom mold 14 are disclosed in, for instance, J.P. KOKAI No. Sho 63-31709.

A vitreous china basis material was pressure-cast-molded at a slurry-pressure of 10 kg/cm$^2$ using 6 kinds of molds formed from the open-cell porous materials produced in Comparative Example and Examples 6 and 16 and having the structures shown in FIGS. 1 and 2. The casting was repeated over 10,000 times using each mold, but each mold did not cause formation of any crack and clogging of the mold and continuous casting could be performed.

Regarding the mold having the structure shown in FIG. 1, the mold of Examples are lighter than that of Comparative Example. Therefore, other facilities such as fixing parts and mold clamping devices could likewise be lightened and made compact.

Regarding the mold structure shown in FIG. 2, it is necessary, for reasons of the molding process, that the top mold 13 and the bottom mold 14 are released from the molded article 30 and then the molded article 30 must be transferred while the split mold 12 is fixed to the released molded article 30. At this stage, the split mold 12 of Comparative Example is frequently accompanied by deformation of the molded article due to its weight, but the split molds of Examples are not accompanied by such phenomenon because of the light weight of the split molds.

What is claimed is:

1. A mold for pressure-cast-molding a ceramic article comprising, as a filter medium layer, an open-cell porous material which is prepared by the process comprising;

stirring a mixture comprising a resin phase comprising an epoxy compound and a curing agent capable of curing the epoxy compound through a reaction therewith, a microballoon phase and a water phase to provide an emulsion slurry;

casting the slurry in a water-impermeable mold; and curing the water-containing slurry, wherein said microballoon is in the form of a spherical vitreous material having an average particle size of from about 2 to 60 microns and said microballoon is a mixture of a microballoon having a large average particle size and a low specific gravity and a microballoon having a small average particle size and a high specific gravity.

2. The mold for pressure-cast-molding a ceramic article of claim 1, wherein said emulsion slurry comprises 8 to 45% by volume of the resin phase, 20 to 65% by volume of the microballoon phase and 20 to 60% by volume of the water phase.

3. The mold for pressure-cast-molding a ceramic article of claim 1, wherein the epoxy compound is a bisphenol epoxy resin and the curing agent comprises a polyamide curing agent.

4. The mold for pressure-cast-molding a ceramic article of claim 1, wherein the microballoon mixture comprises a microballoon free of surface-modification and a surface modified microballoon.

* * * * *